Oct. 21, 1952 F. F. BEAN 2,614,864
HYDRAULIC REACH TIGHTENER
Filed May 26, 1951
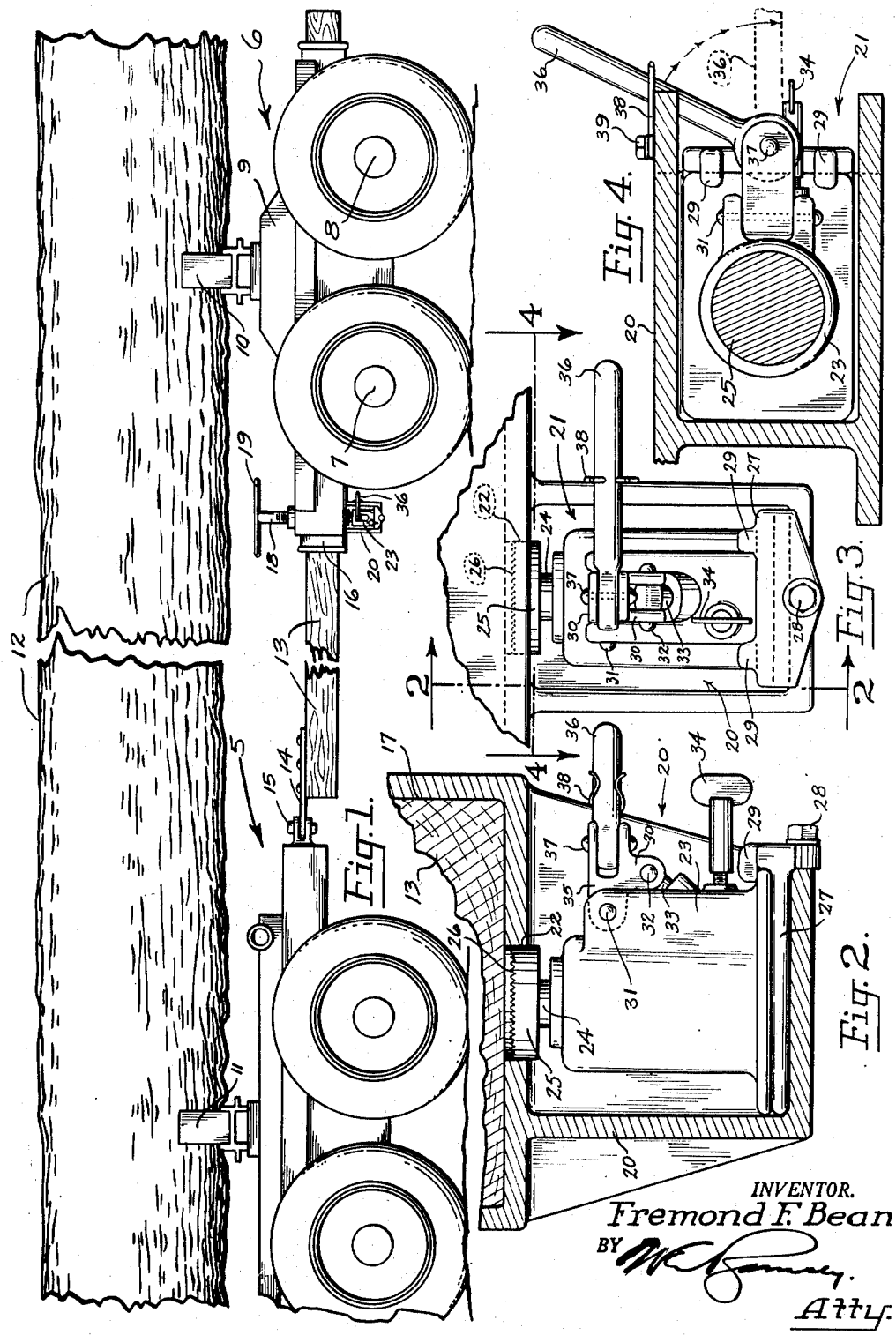
INVENTOR.
Fremond F. Bean
BY
Atty.

Patented Oct. 21, 1952

2,614,864

UNITED STATES PATENT OFFICE 2,614,864

HYDRAULIC REACH TIGHTENER

Fremond F. Bean, Grand Ronde, Oreg.

Application May 26, 1951, Serial No. 228,520

4 Claims. (Cl. 280—142)

This invention relates to a hydraulic tightener which is operative, selectively, to clamp or to release the reach or tow bar which interconnects a logging truck and trailer.

One object of my invention is to provide a reach tightener which is actuated hydraulically and which is accessible laterally from the side of a loaded logging trailer so the driver may operate the same without interference from the load.

Along the highways of western Washington and Oregon and northern California, logging trucks and trailers are a familiar sight. To the uninitiated, however, a logging trailer appears to function in a peculiar manner. Thus, the trailer per se is little more than a skeleton-like, dual-axled bolster carrying a cross bunk. Longitudinally, it is equipped with a centrally disposed box frame member having a hollow tunnel through which an elongated wooden reach or tow bar slidably is fitted. This reach articulates forwardly with the log truck towing unit. During certain operations, the reach is clamped tightly in place whereas, during other operations, the reach is free to slide or move longitudinally within the hollow tunnel. Thus, the pull upon a loaded trailer is transferred, not along the reach as many people believe, but along the log or logs making up the load. On the other hand, when the truck is running empty for a short distance or is maneuvering prior to loading, the reach is clamped in place and the pull is transferred along the reach itself. Yet further, when the trailer is riding tandem upon the back of the truck, as during a high-speed return run, the reach is clamped tight only to prevent the accidental loss thereof. From this description, it will be evident that each run of a logging truck and trailer unit is accompanied by numerous clamp and release operations upon the reach. My invention is directed toward an improved clamp or tightener structure for these logging trailer reaches.

At the present time, the most common tightener for securing a reach in the hollow box frame tunnel of a logging trailer is a threaded screw and plate structure. This structure, upon which I intend to improve, cooperates with the threads in a hole tapped through the top of the trailer box frame member to grip or release the reach. Actuation of the screw is manual and is effected by reaching in laterally over the top of the frame member to grip a lateral purchase rod carried by the screw. Experience has shown, however, that these manual screws are not entirely reliable in operation. Further, the load of logs often will interfere with the operation of the screw. By way of example, a typical loading operation proceeds, in sequence, as follows: The empty truck and trailer unit first is adjusted to the desired effective length by backing off the tightening screw and maneuvering the truck to slide the reach in or out of the tunnel in the trailer frame member. Thereafter, the screw is tightened, the truck and trailer are driven to the proper loading position, and the log or logs are loaded upon the bunks. Finally, preparatory to transporting the load to mill, the screw once more is backed off and the reach is allowed to slide freely within the tunnel. In this manner, one member only, the load, is subject to tension and bending during transport. Were this not so, the load and reach would form two vertically spaced, parallel tension members subject to differential bending, shear, and stress. However, by mounting the forward end of the reach pivotally upon the truck and by allowing the rearward end to slide within the tunnel, substantially all of the stress and strain is relieved therefrom, and is taken instead by the load itself.

Several disadvantages are inherent in the screw tightener now in general use. Firstly, it is evident that the screw must be located clear of the load if the driver is to actuate the same while the trailer is loaded. However, the normal screw location, on top of the box frame and reach, is inappropriate since knots, burls, and limbs often project downwardly and interfere therewith. On some occasions, it has been necessary for the driver physically to chop away a piece of limb or a protruding knot before he can reach the screw to back it off. Upon other occasions, it has been necessary to employ a loader to rotate the logs upon the bunks in order to free the screw tightener for operation. Accordingly, one object of my invention is to provide a tightener which is accessible even though the load is not clean shaven or free of knots, limbs, and the like, thus to speed the loading and transport of logs.

Continuing, those tighteners heretofore employed have provided actuation members, such as the lateral purchase rod, which project laterally in an undesirable manner. Such projections are subject to damage during loading, unloading, and movement of the load. Further, there is always the chance that a shifting load may bump against such a projection and loosen or tighten the screw inadvertently. To counter these disadvantages, it is a further object of my invention to provide a shielded reach tightener which is located within a protective housing of some substantial strength whereby inadvertent damage and actuation are inhibited.

Still one further object of my invention is to provide a reach tightener which is hydraulically actuated by means of a novel handle, such handle to be mounted for pivotal movement about a vertical axis between a freely available operative position and a locked and protected inoperative position. Thus, the actuating handle also will be protected against the contingencies heretofore mentioned.

To this end, my novel reach tightener includes a hollow protective housing which is pendent from the bottom of a logging trailer box frame member. This housing has one open side affording lateral entry into the interior thereof. Additionally, a circular guideway is formed through the bottom of the box frame member intermediate the interior of the housing and the tunnel in the box frame member. A hydraulic lift jack is secured detachably within the protective housing by means of a novel hooked slide. Upon the upper end of the conventional, vertically movable shaft which is carried and actuated by the hydraulic jack, I mount an enlarged circular head which is complementary to and slidably received within the aforementioned circular guideway. The jack actuation handle, on the other hand, is mounted upon a novel pivot axis for movement between an operative and an inoperative position, the latter position being one in which the handle is locked and guarded against inadvertent displacement or damage. Accordingly, in operation, the jack and handle readily are available and accessible, even though the trailer is loaded. Further, the entire operating mechanism is housed, protected, and free of undesirable lateral projections in sharp contrast to those tightener mechanisms heretofore employed.

These and other objects and advantages of my invention will be set forth in the following detailed description, taken in conjunction with the accompanying drawing, wherein:

Fig. 1 is a foreshortened side view of a loaded logging truck and trailer showing a conventional wooden reach and the position, with respect thereto, which my novel hydraulic reach tightener occupies;

Fig. 2 is an enlarged section view, taken substantially on the line 2—2 of Fig. 3 and looking rearwardly from in front of the reach tightener, showing the enlarged circular gripping head slidably received within a guideway formed in the bottom of the box frame member;

Fig. 3 is an enlarged detail view, taken substantially in the same direction as Fig. 1, showing the hydraulic jack and the handle for actuating the same, together with the clip-type keeper member for holding the handle in an inoperative position; and Fig. 4 is a top section view, taken substantially on the line 4—4 of Fig. 3, showing the spaced hooks detachably for holding the hydraulic jack in position and indicating, by arrows and a dashed outline, the swing of the jack operating handle from an inoperative to an operative position.

In Fig. 1, I have shown the rear portion only of a logging truck 5 together with a conventional logging trailer 6. In general, the trailer 6 is dual axled, as at 7 and 8, and includes a bolster 9 upon which is mounted a bunk 10. Thus, the trailer unit per se, with which this invention is concerned, is towed and all motive power is provided by the truck 5.

In conventional loaded operation, the truck 5 is provided with a similar bunk 11 and a load, such as a huge Douglas fir log 12, rests upon the two bunks. The pull from the truck to the trailer is transmitted, in tension, along the log 12, and the conventional reach or tow bar 13 merely serves a limited guide function. To this end, a strap 14 is bolted or otherwise secured to the reach 13 for connection forwardly with a pivot length 15. Rearwardly, the trailer 6 carries an elongated, longitudinal box frame member 16 having a hollow tunnel 17 of square, rectangular, or other non-circular cross-section. This tunnel and the reach 13 are of complementary contour and the reach is carried slidably within the tunnel. Thus, in loaded operation, the reach 13 serves a lateral guide function but no tension or longitudinal pulling force is transmitted therethrough.

When the logging truck and trailer are not loaded, as during short empty runs or when the unit is maneuvered prior to loading, the reach 13, of course, must be clamped in place to interconnect the truck and trailer. To this end, I have shown at 18, the conventional threaded screw which heretofore has been utilized to clamp the reach 13 within the hollow tunnel 17. This threaded screw includes a lateral purchase rod 19 with which the screw is tightened. Further, it will be noted, the screw and rod both are located on top of the box frame member 16 directly beneath the log 12. This location is the cause of one of the disadvantages inherent in this prior structure since knots, branches, and burls often protrude from the log 12 and these interfere with the operation of the tightener. Further, in securing a tight grip upon the reach, it often has been necessary to place a length of pipe over the rod 19 to increase the turning purchase. I have shown this conventional or prior structure in combination with the novel structure of the instant invention because it is contemplated that most truck operators merely will add my new structure to their trailers rather than buying an entire new trailer outfit.

Turning now to the details of my novel structure, a hollow protective housing 20 is made pendent from the bottom of the box frame 16. One side of this housing is left open, as is indicated at 21, to afford lateral entry to the hollow interior thereof. Further, the bottom of the box frame 16 is pierced by a circular guideway 22 to afford open communication between the tunnel 17 and the interior of the housing. A hydraulic jack 23, of conventional design, is carried within the protective housing 20 and a vertically movable shaft 24, actuated by hydraulic fluid pressure, protrudes slidably from the top thereof. Secured to the top of this shaft 24, I have shown an enlarged circular gripping head 25 having a notched upper surface 26. This gripping head 25 is complementary to and is slidably received within the aforementioned circular guideway 22. Thus, vertical actuation of the jack shaft 24 will move the notched surface 26 vertically into and out of engagement with the reach 13. Further, when such engagement is effected, the tight-fitting circular guideway 22 will serve to relieve any shearing forces which might otherwise be transferred to the shaft 24. For example, if the truck is towing the trailer through the medium of the reach 13, any longitudinal shear imposed upon the notched surface 26 and gripping head 25 will be transferred from the circular guideway 22 directly to the box frame member 16 rather than to the vertical jack shaft 24.

In mounting the hydraulic jack 23 within the protective housing 20, I prefer to employ a flat slide member 27 which closely underlies the base of the jack and detachably is secured to the housing by means of a stud bolt 28. Further, this slide is provided with two spaced finger hooks 29 which encompass and grip the base of the jack to hold the same against movement and to lock it in place.

In actuation of the jack 23, an operating member 30 is pivotally mounted, as at 31, and is pivotally attached, as at 32, to the rod 33 of a conventional hydraulic jack operating piston (not shown). Further, a valve stem thumbpiece 34 is provided to release or exhaust the pressure within the jack when lowering the vertical shaft 24. Thus, reciprocation of the operating member 30 about the pivot 31 will actuate the hydraulic jack operating piston to raise the shaft 24. Manipulation of the thumbpiece 34, on the other hand, will release the hydraulic pressure to lower the vertical shaft 24.

In Figs. 2, 3, and 4, I have shown a further novel feature of my invention. Thus, the operating member 30 has been bifurcated to provide two projecting fingers 35. These fingers accommodate the flattened end of a jack-operating handle 36 for pivotal movement about a vertical axis which is defined by a pivot member 37. Additionally, a clip-type keeper member 38 is secured to one side of the protective housing 20, as at 39, to lock the handle 36 in an inoperative position. Thus, the handle 36 is mounted for pivotal movement about a vertical axis between the operative dashed line position of Fig. 4 and the inoperative full line position thereof. In the operative dashed line position, the handle 36 extends laterally out from the jack 23 so that reciprocation of the operating member 30 may be had. On the other hand, the inoperative full line position of Fig. 4 is defined when the keeper 38 locks the handle to one side. This latter position, of course, is the normal position when the jack is not being raised.

In assembling my novel hydraulic reach tightener, the vertical shaft 24 is fitted with the cylindrical gripping head 25 and the entire mechanism is inserted through the open side 21 into the protective housing 20. Thereafter, the gripping head 25 is aligned slidably within the guideway 22 and the flat member 27 is slipped underneath the base of the jack. With the spaced finger hooks 29 gripping the base of the jack, the stud bolt 28 is tightened and the mechanism is ready for operation.

If, for example, the log 12 has just been loaded upon the bunks, the reach 13 must be loosened or released for free movement within the tunnel 17. By proper manipulation of the valve stem thumbpiece 34, the hydraulic jack 23 is caused to lower the vertical shaft 24 so the gripping head 25 will free the reach 13. At a later time, if the reach 13 once more is to be tightened, the handle 36 is pivoted out of engagement with the keeper 38 and is utilized to reciprocate the operating member 30 about the pivot 31. This reciprocation causes the jack 23 hydraulically to lift the shaft 24 and the head 25 into tight gripping relationship with the under side of the wooden reach 13. Further, the notch surface 26 bites into and tightly grips the reach 13 to hold the same against inadvertent or undesirable longitudinal displacement. Thereafter, of course, the handle 36 once more is pivoted into engagement with the keeper 38 to define the aforementioned inoperative position.

From the above description, it will be seen that I have provided a hydraulic reach tightener which is accessible laterally from the side of the logging trailer 6 even though such trailer be loaded with a log or logs which have protruding branches, knots, and burls extending vertically down therefrom. Further, I have provided a protective housing 20 which shields my hydraulic reach tightener from inadvertent damage or actuation during loading or during other operations of the truck and trailer unit. The keeper member 38, of course, cooperates with this protective housing to hold the handle 36 in an inoperative position so the hydraulic jack cannot be operated until the handle is freed therefrom. In short, my hydraulic reach tightener provides a sure grip, it is reliable in operation, and the parts thereof are protected from damage or inadvertent operation, all to the end of providing an improved hydraulic reach tightener for the logging industry.

I claim:

1. In combination, an elongated hollow box frame having a longitudinal tunnel therethrough, an elongated reach slidably carried within said tunnel, said reach being of complementary contour to said tunnel, a hollow protective housing pendent from the bottom of said box frame and having one side thereof open, a guideway open to both said tunnel and housing, a hydraulic jack carried within said housing and having a vertically movable gripping head upon the upper end thereof, said gripping head being slidably received within said guideway for vertical movement upwardly into frictional holding contact with said reach, and a flat slide member carried by said housing and underlying said jack to space the same from the bottom of said housing.

2. In combination, an elongated hollow box frame member having a longitudinal tunnel therethrough, an elongated wooden reach slidably carried within said tunnel, a hollow protective housing pendent from the bottom of said box frame and having one side thereof open to afford lateral entry into the housing, a guideway piercing the bottom of said box frame and open to said tunnel and housing, a hydraulic lift jack carried within said housing and having a vertically movable shaft carrying an enlarged gripping head upon the upper end thereof, said gripping head being slidably received within said guideway and having a notched surface for vertical movement upwardly into frictional holding contact with the under surface of said wooden reach, and a reciprocal handle means protruding from said housing open side for actuating said jack, said handle being mounted for pivotal movement about a vertical axis between an operative position extending laterally out from said jack and an inoperative position extending longitudinally to the side thereof for locking engagement with a clip-type keeper.

3. In combination, a logging trailer carrying an elongated hollow box frame member having a longitudinal tunnel therethrough, an elongated reach slidably carried within and protruding from both ends of said tunnel, said reach being of complementary contour to said tunnel, a hollow protective housing carried below said box frame and having one side thereof open to afford lateral access to the interior of the housing, a circular vertical guideway in the bottom of said box frame, said guideway opening to said tunnel and housing, a hydraulic lift jack carried within and closely encompassed by said housing, said jack having a vertically movable shaft carrying an enlarged circular gripping head upon the upper end thereof, said gripping head being slidably received within said guideway for vertical movement upwardly into frictional holding contact with said reach, a reciprocal handle and hydraulic valve stem means protruding from said housing open side for vertical actuation of said jack, and a flat slide member underlying the base of said jack, said slide member carrying spaced finger hooks extending upwardly to grip the base of said jack and hold the same against longitudinal movement.

4. In combination, an elongated hollow box frame member having a longitudinal tunnel of noncircular cross-section therethrough, an elongated wooden reach of complementary noncircular cross-section slidably carried within and protruding from both ends of said tunnel, a hollow protective housing pendent from the bottom of said box frame adjacent one end thereof and having one side thereof open to afford lateral entry into the housing, a circular guideway piercing the bottom of said box frame and open to said tunnel and housing, a hydraulic lift jack carried within said housing and having a vertically movable shaft carrying an enlarged circular gripping head upon the upper end thereof, said gripping head being closely encompassed by and slidably received within said guideway and having a notched surface for vertical movement upwardly into frictional holding contact with the under surface of said reach, a reciprocal handle means protruding from said housing open side for actuating said jack, said handle being mounted for pivotal movement about a vertical axis between an operative position extending laterally out from said jack and an inoperative position longitudinally to the side for locking engagement with a clip-type keeper, and a flat slide member detachably secured to said housing and underlying said jack, said slide member carrying spaced finger hooks for gripping said jack and holding the same against longitudinal movement.

FREMOND F. BEAN.

REFERENCES CITED

The following references are of record in the file of this patent:

UNITED STATES PATENTS

| Number | Name | Date |
|---|---|---|
| 704,858 | Chapman | July 15, 1902 |